(12) United States Patent
Rahman et al.

(10) Patent No.: US 12,275,674 B2
(45) Date of Patent: Apr. 15, 2025

(54) BASALTIC LAVA FOR PRODUCING GREEN CONTROLLED LOW STRENGTH MATERIAL (CLSM)

(71) Applicants: SAUDI ARABIAN OIL COMPANY, Dhahran (SA); King Fahd University of Petroleum & Minerals, Dhahran (SA)

(72) Inventors: Muhammed Kalimur Rahman, Dhahran (SA); Mohammed Ibrahim, Dhahran (SA); Mohammed Salihu Barry, Thoqbah (SA); Syed Khaja Najamuddin, Al Khobar (SA); Zakariya Saleh Al-Helal, Dhahran (SA); Carlos Acero, Dhahran (SA)

(73) Assignees: Saudi Arabian Oil Company, Dhahran (SA); King Fahd University of Petroleum & Minerals, Dhahran (SA)

(*) Notice: Subject to any disclaimer, the term of this patent is extended or adjusted under 35 U.S.C. 154(b) by 248 days.

(21) Appl. No.: 17/862,181

(22) Filed: Jul. 11, 2022

(65) Prior Publication Data

US 2024/0010556 A1    Jan. 11, 2024

(51) Int. Cl.
*C04B 7/02* (2006.01)
*C04B 7/34* (2006.01)
(Continued)

(52) U.S. Cl.
CPC .................. *C04B 7/34* (2013.01); *C04B 7/02* (2013.01); *C04B 14/06* (2013.01); *C04B 2111/00017* (2013.01); *C04B 2201/50* (2013.01)

(58) Field of Classification Search
CPC . C04B 7/02; C04B 14/06; C04B 2111/00017; C04B 2201/50; C04B 7/34;
(Continued)

(56) References Cited

U.S. PATENT DOCUMENTS

| 5,951,751 A | 9/1999 | Williams et al. |
| 6,821,336 B1 | 11/2004 | Ramme et al. |

(Continued)

FOREIGN PATENT DOCUMENTS

| BR | 102017027894 A2 | 7/2017 |
| CN | 1137496 A | 12/1996 |

(Continued)

OTHER PUBLICATIONS

Ramme et al., ACI 229R-99, "Controlled Low-Strength Materials", Reported by ACI Committee 229, American Concrete Institute, 1999. (Year: 1999).*

(Continued)

*Primary Examiner* — Jun Li
(74) *Attorney, Agent, or Firm* — Bracewell LLP; Constance G. Rhebergen; Eleanor T. Porter

(57) ABSTRACT

Disclosed is a composition for a Controlled Low Strength Material (CLSM) including cementitious materials, water, and fine aggregate. The cementitious materials include powdered basaltic lava and Ordinary Portland Cement (OPC). In the composition, the basaltic lava replaces some of the ordinary Portland cement in the CLSM as compared to a conventional CLSM. The basaltic lava replaces 25% to 90% of the OPC in a conventional CLSM. The CLSM can be used as a compacted fill for structural and non-structural construction applications.

9 Claims, 3 Drawing Sheets

(51) Int. Cl.
  *C04B 14/06* (2006.01)
  *C04B 111/00* (2006.01)
(58) Field of Classification Search
  CPC ....... C04B 2111/00103; C04B 2201/20; C04B 28/04; C04B 14/14; C04B 14/28
  See application file for complete search history.

(56) References Cited

U.S. PATENT DOCUMENTS

| | | | |
|---|---|---|---|
| 7,390,444 | B2 | 6/2008 | Ramme et al. |
| 8,444,761 | B2 | 5/2013 | Al-Mehthel et al. |
| 8,945,300 | B2 | 2/2015 | Al-Mehthel et al. |
| 9,150,455 | B2 | 10/2015 | Al-Mehthel et al. |
| 9,249,304 | B2 | 2/2016 | Al-Mehthel et al. |
| 11,078,117 | B2 | 8/2021 | Nissinen et al. |
| 11,414,351 | B2* | 8/2022 | Rubio ............ C04B 14/4668 |
| 2002/0162484 | A1 | 11/2002 | Ramme et al. |
| 2011/0067601 | A1 | 3/2011 | Fried |
| 2013/0104779 | A1 | 5/2013 | Al-Mehthel et al. |
| 2013/0118382 | A1 | 5/2013 | Al-Mehthel et al. |
| 2015/0122148 | A1 | 5/2015 | Wahhab et al. |
| 2016/0168028 | A1* | 6/2016 | Guerra Barrena ........ C04B 7/48 106/724 |
| 2017/0283319 | A1 | 10/2017 | Maslehuddin et al. |
| 2018/0222798 | A1* | 8/2018 | Ibrahim ................ C04B 28/04 |
| 2018/0265405 | A1 | 9/2018 | El Naggar et al. |
| 2019/0284804 | A1 | 9/2019 | Ibrahim et al. |
| 2019/0359527 | A1* | 11/2019 | Ciuperca ................ C04B 7/12 |
| 2020/0102248 | A1 | 4/2020 | Alkhatib et al. |
| 2020/0277230 | A1 | 9/2020 | Ibrahim et al. |
| 2020/0290925 | A1 | 9/2020 | Skocek et al. |
| 2021/0002171 | A1* | 1/2021 | Ciuperca ................ C04B 7/51 |

FOREIGN PATENT DOCUMENTS

| | | | | |
|---|---|---|---|---|
| CN | 101157527 | A | 4/2008 | |
| CN | 102503191 | A | 6/2012 | |
| CN | 102701615 | A | 10/2012 | |
| CN | 104844111 | A | 8/2015 | |
| CN | 108203270 | A | 6/2018 | |
| CN | 108264292 | A | 7/2018 | |
| CN | 113045264 | A | 6/2021 | |
| IL | 105654 | A | 6/1997 | |
| IL | 115988 | A | 9/1999 | |
| KR | 100562594 | B1 | 3/2006 | |
| KR | 101115950 | | 2/2012 | |
| KR | 1014871790000 | B1 | 1/2015 | |
| KR | 101487179 | B1 | 2/2015 | |
| TW | I307335 | B | 3/2009 | |
| WO | WO-2013052952 | A2 * | 4/2013 | ........... C04B 14/108 |

OTHER PUBLICATIONS

Celik et al., "High-volume natural volcanic pozzolan and limestone powder as partial replacements for portland cement in self-compacting and sustainable concrete" in Cement and Concrete Composites, pp. 136-147, 2014. (Year: 2014).*
ASTM C33/C33M, ASTM International, "Standard Specification for Concrete Aggregates", Book of Standards vol. 04.02, Published Apr. 2018. (Year: 2018).*
Adana Oyak Cimento Cem 1 42, 5 R Cement Product Information Portland Cement (2023) (Year: 2023).*
Eabassoc Types Grades of Cement (2024) (Year: 2024).*
Durability properties of concretes made with sand and cement size basalt Hanifi Binici a, , Yavuz Yardim b , Orhan Aksogan c , Rifat Resatoglu d , Aytac Dincer e , Ali Karrpuz e a Nisantasi University, Department of Civil Engineering, Maslak Mahallesi, Tayoncas Istanbul, Turkey (2020) (Year: 2020).*
Estifanos et al., Assessing the aptitude of vesicular volcanic rocks as pozzolanic sources for supplementary cementitious materials, Bulletin of Engineering Geology and the Environment, publication date Feb. 19, 2018, https://doi.org/10.1007/s10064-018-1239-0.*

Achtemichuk et al., The utilization of recycled concrete aggregate to producecontrolled low-strength materials without using portland cement. Cement & Concrete Composites 2009;31:564-9.
Al-Osta, et al., "Study Of Heavy Fuel Oil Fly Ash For Use In Concrete Blocks And Asphalt Concrete Mixes," Advances in Concrete Construction, vol. 4, Issue 2, 2016, pp. 123-143.
Benlamoudi, et al., "Incorporation of Alternative Fuels and Raw Materials (AFR) to Produce a Sustainable Cement," International Journal of Engineering & Technology, 7(4.30), 136-140 (2018).
Bernal, et al., "Management and Valorisation of Wastes Through Use in Producing Alkali-Activated Cement Materials," Journal of Chemical Technology and Biotechnology, 91 (9). pp. 2365-2388 (2016).
Camilleri et al., "The Microstructure and Physical Properties of Heavy Oil Fuel Ash Replaced Portland Cement for Use in Flowable Fill Concrete and the Production of Concrete Masonry Units", Construction and Building Materials, vol. 38, 2013, pp. 970-979.
Dobiszewska, et al., "Investigating the Influence of Waste Basalt Powder on Selected Properties of Cement Paste and Mortar," IOP Conf. Ser.: Mater. Sci. Eng., 245, 2017.
Folliard, et al., "Development of a Recommended Practice for Use of Controlled Low-Strength Material in Highway Construction," National Academies of Sciences, Engineering, and Medicine, 2008, 150 pages.
Ibrahim et al., "A review on utilization of industrial by-products in the production of controlled low strength materials and factors influencing the properties", Construction and Building Materials, vol. 325, 2022, 126704.
International Search Report and Written Opinion for related PCT application PCT/US2020/021967 dated Jun. 15, 2020.
Kuo, et al., Engineering properties of controlled low-strength materials containing waste oyster shells. Construction and Building Materials 46, 128-133, 2013.
Liu, et al., "A Study on the Relationships between Water Film Thickness, Fresh Properties, and Mechanical Properties of Cement Paste Containing Superfine Basalt Powder (SB)," Materials, 14, 2021.
Mofarrah, et al., "Investigation of the Potential Use of Heavy Oil Fly Ash as Stabilized Fill Material for Construction," Journal of Materials in Civil Engineering, vol. 24, No. 6, pp. 684-690, 2012.
N. Rajendran, "Controlled Low Strength Materials (CLSM)," American Concrete Institute, Committee 229, ACI 229R-94 Report, 1994.
Paya et al., "Properties of Portland cement mortars incorporating high amounts of oil-fuel ashes", Waste Management, 1999, pp. 7.
Ponzi, et al., "Basalt Powder as a Supplementary Cementitious Material in Cement Paste for CCS Wells: Chemical and Mechanical Resistance of Cement Formulations for CO2 Geological Storage Sites," International Journal of Greenhouse Gas Control, 109 (2021).
Qiao, et al., "The Feasibility of Basalt Rock Powder and Superfine Sand as Partial Replacement Materials for Portland Cement and Artificial Sand in Cement Mortar," Research and Application of Materials Science, 1:1 (2019).
Tangchirapat et al., "Use Of Ground Palm Oil Fuel Ash to Improve Strength, Sulfate Resistance, And Water Permeability of Concrete Containing High Amount Of Recycled Concrete Aggregates", Materials & Design, vol. 41, 2012, p. 150-157.
Trejo, et al., "Sustainable development using controlled low-strength material," International Workshop on Sustainable Development and Concrete Technology, Jan. 2004, pp. 231-250.
Zhang et al., "Rapid-Hardening Controlled Low Strength Materials Made of Recycled Fine Aggregate from Construction and Demolition Waste", Construction and Building Materials, vol. 173, 2018, pp. 81-89.
Al-Malack, et al., Characteristics of Fly Ash Produced at Power and Water Desalination Plants Firing Fuel Oil, Int. J. Envir. Res., v. 7(2), Spring 2013, pp. 455-466.
Do, et al., Development of a New Cementless Binder for Controlled Low Strength Material (CLSM) Using Entirely By-products, Construction and Building Materials 206 (2019), pp. 576-589.
Folliard, et al., Development of a Recommended Practice for Use of Controlled Low-Strength Material in Highway Construction (2008), National Academies Sciences Engineering Medicine, NCHRP Report 597, 151 pgs.

(56) References Cited

OTHER PUBLICATIONS

Katz, et al., Properties of Concrete Made with Recycled Aggregates from Partially Hydrated Old Concrete, Cement and Concrete Research, vol. 33, No. 5, pp. 703-711, May 2003.
Katz, et al., Utilization of Industrial By-Products for the Production of Controlled Low-Strength Materials, Waste Management (Oxford) 2004; 24:501-512.

* cited by examiner

BASALTIC LAVA FOR PRODUCING GREEN CONTROLLED LOW STRENGTH MATERIAL (CLSM)

FIELD

This disclosure relates to a controlled low strength material (CLSM) and methods of production and use. More specifically, this disclosure relates to utilizing basaltic lava as a natural additive in CLSM.

BACKGROUND

Controlled low strength material (CLSM) is a self-compacting and flowable low-strength cementitious material used primarily as backfill and often as an alternative to compacted fill. CLSM is a slurry made primarily of fine aggregate, water, and small quantities of cementitious material. CLSM can include other components. The properties that make CLSM a desirable engineered material are the ability of the slurry to self-consolidate or self-compact in a fresh state, while maintaining the possible capability to be excavated after hardening. CLSM can be placed in confined spaces, irregular excavations, or hard to reach places such as beneath undercuts of existing slabs. CLSM is considered a cost effect, labor- and time-saving alternative for compacted fills. CLSM has the benefits of ease of mixing and ease of placement, rapid curing, incompressibility after curing, and reduction of equipment needs, labor costs, and inspections. It also hardens within hours without the need of compaction or processing in layers.

Although CLSM can be designed and produced in a similar way to concrete, there are substantial differences between controlled low strength material and concrete. Conventional concrete is designed to resist large stresses in compression and can have a compressive strength in a range of 14 MPa to 50 MPa. Typically, the durability of concrete is affected by the ability to protect the reinforcing steel from corrosion. Therefore, it is desirable for concrete to have high density and low permeability. On the other hand, CLSM is mainly used as a substitute for a strong soil and the ability to later excavate the CLSM is an important parameter. Therefore, the compressive strength of the material should not typically exceed 300 KPa to 2.1 MPa. Also, because there is no reinforcement of any type in controlled low strength material, the permeability of CLSM is not a critical feature of the controlled low strength material.

Two categories of CLSM exist: excavatable and non-excavatable. Excavatable CLSM can be excavated at a later date with ease by widely used excavation methods (such as heavy equipment like backhoes). Non-excavatable CLSM is not intended to harden such that it is not easily excavated, and requires additional equipment to excavate (such as jackhammers). To be considered a CLSM, once cured, the mix must not have an unconfined compressive strength exceeding 8.3 MPA (1200 psi). However, excavatable CLSM generally has an unconfined compressive strength that does not exceed 2.1 MPa (300 psi).

Some conventional CLSM utilizes industrial by-products and waste materials such as conventional fly ash as a partial replacement for aggregate and Ordinary Portland Cement (OPC). Conventional fly ash is plentiful in areas where coal power plants are used to generate electricity; however, conventional fly ash is not as available in areas where power is generated through oil or gas. Therefore, additional materials for use in CLSMs are needed to reduce OPC usage while still generating quality CLSM materials.

SUMMARY

Compositions for a CLSM are provided that utilize OPC and powdered basaltic lava as cementitious materials. The powdered basaltic lava is a natural pozzolan that replaces a portion of the OPC such that the OPC is reduced as compared to a conventional CLSM. The ratio of the OPC to powdered basaltic lava is selected to reach a target compressive strength. The CLSM also includes water, a first fine aggregate, and a second fine aggregate.

Disclosed herein is a controlled low strength material (CLSM) having reduced environmental impact. The CLSM incudes a first fine aggregate containing sand, a second fine aggregate containing limestone, water, and cementitious materials. The cementitious materials include ordinary Portland cement (OPC) and powdered basaltic lava. The ratio of OPC to powdered basaltic lava is selected to produce a compressive strength equal to or below a target compressive strength.

In some embodiments, the powdered basaltic lava has a composition comprising between 35 to 45 wt % $SiO_2$, between 7 to 18 wt % $Al_2O_3$, between 12 to 23 wt % $Fe_2O_3$, and between 6 to 17 wt % CaO. The CLSM comprises between 10.5 wt % powdered basaltic lava and 14.5 wt % powdered basaltic lava. The ratio of OPC to powdered basaltic lava is in the range of 1:3 to 1:9. In some embodiments, the powdered basaltic lava is gathered from Saudi Arabia. The CLSM includes a limestone aggregate. The second fine aggregate is sized between 2.38 mm and 4.75 mm. The target compressive strength is a 28 day compressive strength of 8.3 MPa. In some embodiments, the target compressive strength is a 28 day compressive strength of 2.1 MPa.

Also disclosed herein is a controlled low strength material (CLSM) having reduced environmental impact, that essentially consists of a first fine aggregate containing sand, a second fine aggregate containing limestone, water, and cementitious material. The cementitious materials include ordinary Portland cement (OPC) and powdered basaltic lava. The ratio of OPC to powdered basaltic lava is selected to produce a compressive strength equal to or below a target compressive strength.

In some embodiments, the CLSM comprises between 10.5 wt % powdered basaltic lava and 14.5 wt % powdered basaltic lava. The ratio of OPC to powdered basaltic lava is in the range of 1:3 to 1:9. The second fine aggregate is sized between 2.38 mm and 4.75 mm. In some embodiments, the target compressive strength is a 28 day compressive strength of 8.3 MPa. In other embodiments, the target compressive strength is a 28 day compressive strength of 2.1 MPa.

Further disclosed herein is a method for forming a concrete material having reduced environmental impact. The method includes the step of mixing together constituent materials to form a controlled low strength material (CLSM). The constituent materials include a first fine aggregate containing sand, a second fine aggregate containing limestone, a water, and cementitious materials. The cementitious materials include ordinary Portland cement (OPC) and powdered basaltic lava. The ratio of OPC to powdered basaltic lava is selected to produce a compressive strength equal to or below a target compressive strength.

In some embodiments, the CLSM comprises between 10.5 wt % powdered basaltic lava and 14.5 wt % powdered basaltic lava. The ratio of OPC to powdered basaltic lava is in the range of 1:3 to 1:9. The second fine aggregate is sized between 2.38 mm and 4.75 mm. The target compressive strength is a 28 day compressive strength of 8.3 MPa. In some embodiments, the target compressive strength is a 28 day compressive strength of 2.1 MPa.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

DETAILED DESCRIPTION

Figure 1A:
FIG. 1A is a photograph of pyroclastic cones in lava fields which can be a source of material, according to an embodiment.

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

The terms "comprising," "including," "having," and the like, as used with respect to embodiments of the present disclosure, are synonymous and are each intended to have an open, non-limiting meaning that does not exclude additional elements or steps. In this disclosure the terms "about" and "approximately" can include a deviation of ±5% of the given value unless the deviation changes the nature or effect of the value such that it is not operable to achieve its intended purpose. The terms "optional" or "optionally" mean that an element can be used for some embodiments, but can be omitted in other embodiments. The singular forms "a," "an," and "the" include plural referents, unless the context clearly dictates otherwise.

Compositions, methods of generation, and methods of use are provided for a CLSM made with natural materials. Specifically, a CLSM generated with powdered basaltic lava which replaces a portion of the cementitious material is disclosed. The powdered basaltic lava is a natural material that replaces a portion of the OPC in the mixture, thus reducing the negative environmental impact of the CLSM.

The CLSM disclosed herein provides numerous benefits over conventional CLSM. Advantageously, basaltic lava is generally inexpensive, widely available in portions of the world, and can be utilized in areas where conventional fly ash is not widely available or where conventional fly ash production is diminishing. The present CLSM utilizes less OPC than conventional CLSM, which also reduces costs and decreases the negative environmental impact. The use of natural basaltic lava also reduces the greenhouse gas emissions of CLSM, since OPC production generates large quantities of greenhouse gases. Additionally, the CLSM of the present invention does not utilize fly ash, which in some parts of the world may be banned due to the negative environmental impact. Basaltic lava is free of many hazardous materials, such as crystalline silica, which may be found in other CLSM additives or components.

Beneficially, the powdered basaltic lava utilized in the embodiments disclosed herein is not processed outside of grinding and optionally sieving, and the powdered basaltic lava does not require any heat treatment. The addition of basaltic lava to CLSM advantageously reduces bleeding and segregation considerably. The use of powdered basaltic lava also reduces the heat of hydration, which can reduce the likelihood of thermal cracking and is advantageous for large CLSM applications. Additionally, it has been found to be easier to control the strength gain of CLSM when utilizing powdered basaltic lava than when utilizing fly ash or only OPC.

To be considered a CLSM, once cured, the mix must not have an unconfined compressive strength exceeding 8.3 MPA (1200 psi). However, excavatable CLSM generally has an unconfined compressive strength that does not exceed 2.1 MPa (300 psi). Additionally, CLSM must have a flow spread diameter of more than 200 mm to be classified as a CLSM. CLSM must generally have a hardening time of less than or equal to 12 hours, a bleeding rate of less than or equal to about 5%, and a segregation rate of less than or equal to about 15%.

Figure 1B:
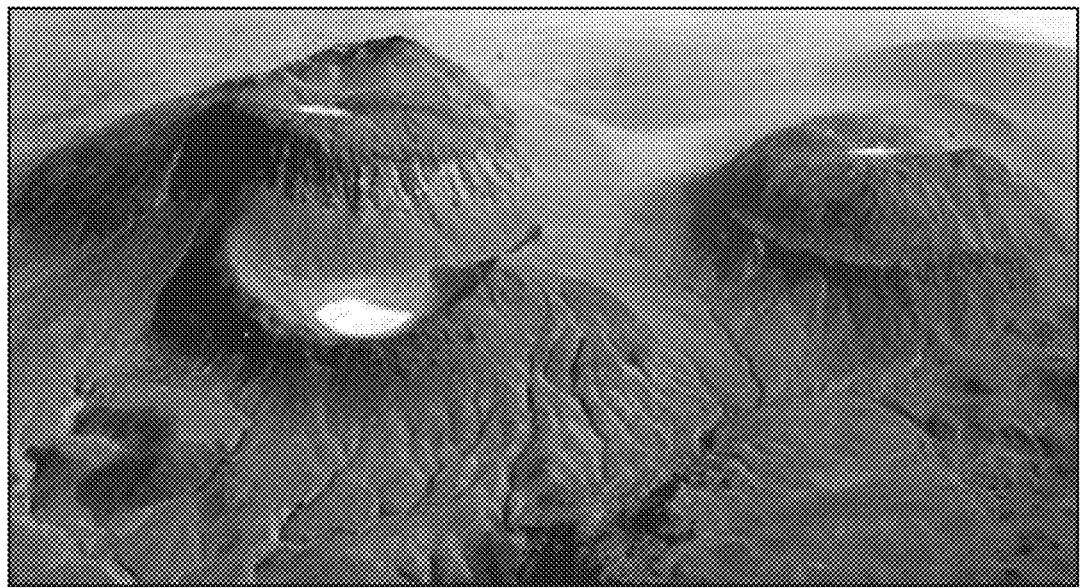
FIG. 1B is a photograph of pyroclastic cones in lava fields which can be a source of material, according to an embodiment.

As used herein, powdered basaltic lava is a powdered form of volcanic rock. Basaltic lava is widely available around the world. Basaltic lava is also widely available on the coast of the Red Sea in the western region of Saudi Arabia. In some embodiments, the basaltic lava is gathered from the Red Sea coast in the western region of Saudi Arabia. Referring to FIG. 1A, a photograph is provided of pyroclastic cones of lava fields on the coast of the Red Sea, which can be a source of basaltic lava which can then be processed into powdered basaltic lava and utilized in embodiments disclosed herein. Referring to FIG. 1B, a second photograph is provided of different pyroclastic cones of lava fields on the coast of the Red Sea, which can be a source of basaltic lava which can then be processed into powdered basaltic lava and utilized in embodiments disclosed herein.

Figure 2:
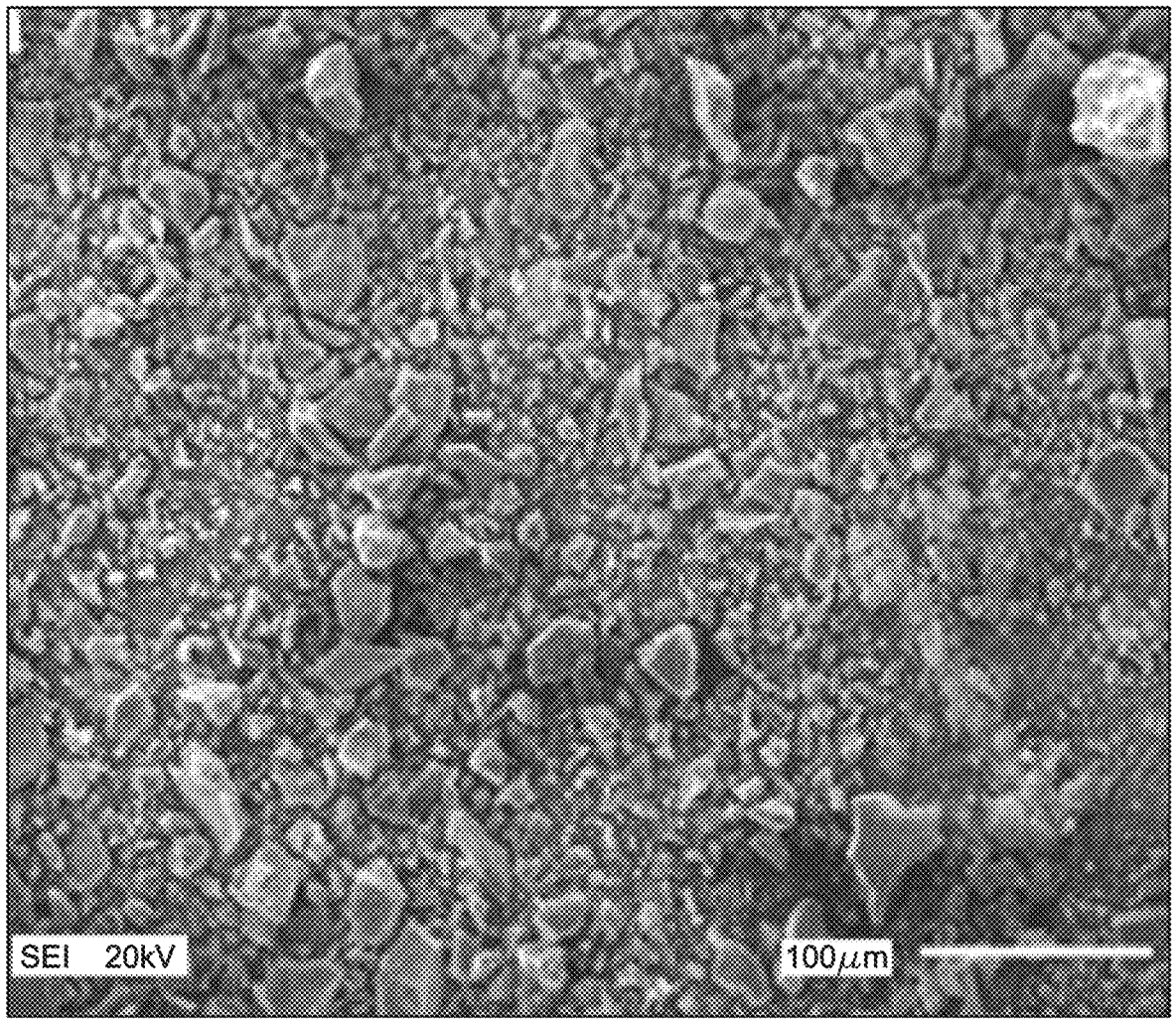
FIG. 2 is a photograph of a scanning electron microscope (SEM) result from raw basaltic lava, according to an embodiment.
Figure 3:
FIG. 3 is a photograph of basaltic lava powder after grinding, according to an embodiment.

Referring to FIG. 2, a photograph of the result of an SEM of basaltic lava powder after grinding is provided, showing the irregular shape and size of the material. Referring to FIG. 3, a photograph of basaltic lava powder after grinding is provided. To generate the powdered basaltic lava, raw basaltic lava aggregate or fines in various sizes are collected. The raw basaltic lava aggregate or fines are ground in grinders known in the art to the fineness required for the intended purpose. The ground powder can be sieved. In the present disclosure, the powdered basaltic lava is a mixture of various shapes and sizes of particles, like what is shown in FIG. 2. The powdered basaltic lava has an irregular morphology and primarily consists of non-spherical particles. In some embodiments, the powdered basaltic lava has a specific surface area of about 442 $m^2/kg$ and an average particles size of about 30 μm.

The powdered basaltic lava is a natural pozzolan. Pozzolans are siliceous and aluminous materials which in their natural form are not cementitious or exhibit little cementitious value, but, when powdered and added to water, react chemically with calcium hydroxide to form compounds with cementitious properties. Natural pozzolans are naturally occurring or are derived directly from naturally occurring deposits, and are not generated by industrial or chemical processes.

Artificial pozzolans are man-made in industrial or chemical processes, are usually generated through heat treatment, and are not derived from naturally occurring materials. Artificial pozzolans can include fly ash, blast furnace slag, silica fume, and other industrial by-products. Both natural and artificial pozzolans have variable compositions and chemical characteristics. Thus, pozzolans cannot simply be substituted one for one in cementitious mixtures due to their varying characteristics. The oxide quantities of $SiO_2$, $Al_2O_3$, and CaO vary between artificial and natural pozzolans, and between types and sources of pozzolans. For example, blast furnace slag can have a $SiO_2$ content of between about 20 to about 35 wt % and a CaO content of about 28 to about 40 wt %, fly ash can have a $SiO_2$ content of between about 50 to about 55 wt % and an $Al_2O_3$ content of between about 25 to about 30 wt %, and silica fume can have a $SiO_2$ content of between about 85 to about 98 wt %.

In contrast, the powdered basaltic lava in the embodiments disclosed herein can have between about 35 to about 45 wt % $SiO_2$, between about 7 to about 18 wt % $Al_2O_3$, between about 12 to about 23 wt % $Fe_2O_3$, between 6 about to about 17 wt % CaO, between about 3 to about 14 wt % MgO, between about 0 to about 7 wt % $K_2O$, between about 0 to about 9 wt % $Na_2O$, between about 0 and about 5 wt % $P_2O_5$, and between about 0 and about 5 wt % $TiO_2$. The powdered basaltic lava can have the chemical composition and loss on ignition (LOI) value shown in Table 1:

TABLE 1

Chemical Composition of Basaltic Lava

| Compound | $SiO_2$ | $Al_2O_3$ | $Fe_2O_3$ | CaO | MgO | $K_2O$ | $Na_2O$ | $P_2O_5$ | $TiO_2$ | LOI |
|---|---|---|---|---|---|---|---|---|---|---|
| Weight % | 40.48 | 12.90 | 17.62 | 11.83 | 8.33 | 1.67 | 3.60 | 1.37 | 0.60 | 1.6 |

The basaltic lava utilized in the present disclosure can have the physical properties shown in Table 2:

TABLE 2

Physical Properties of Basaltic Lava

| Property | Value | ASTM C 618 |
|---|---|---|
| Fineness: Amount Retained when wet-sieved on 45-μm (No. 325) Sieve, Max, % | 3.798 | 34 (max) |
| Strength Activity Index: with OPC, at 7 days, Min 5 of Control | 80.14 | 75 (min) |
| Water Requirement, Max, 5 of Control | 105 | 115 (max) |
| Soundness: Autoclave Expansion or Contraction, Max, 5 | 0.274 | 0.8 (max) |

The present CLSM comprises a first fine aggregate substantially containing sand, cementitious materials including OPC, powdered basaltic lava, water, and a second fine aggregate substantially containing limestone. Basaltic lava is utilized as a portion of the present CLSM binder, partially replacing the OPC in the mixture. The present CLSM utilizes less OPC than a comparable conventional CLSM that does not contain powdered basaltic lava. In other words, the powdered basaltic lava replaces some of the OPC in the CLSM to generate the present mixture. In some embodiments, the basaltic lava replaces between approximately 25% to approximately 90% of the OPC in a conventional CLSM. In some embodiments, the 25% substitution of OPC by the powdered basaltic lava resulted in an improvement of both fresh and hardened properties. In some embodiments, the basaltic lava replaces between approximately 75% to approximately 90% of the OPC in a conventional CLSM. In some embodiments, the CLSM can have between 10.5 wt % powdered basaltic lava and 14.5 wt % powdered basaltic lava. In some embodiments, the CLSM can have between 10.5 wt % powdered basaltic lava and 12.5 wt % powdered basaltic lava. The ratio of the OPC to the powdered basaltic lava in the range of 1:3 to 1:9. The ratio of OPC to powdered basaltic lava can be selected such that the CLSM has a compressive strength equal to or below a target compressive strength.

The first fine aggregate substantially contains sand, which can be dune sand. The sand can primarily contain quartz. The first fine aggregate is able to pass through a #4 (4.75 mm) sieve. The first fine aggregate can have a particle size less than or equal to about 4.75 mm. The second fine aggregate substantially contains limestone. The second fine aggregate is able to pass through a #4 (4.75 mm) sieve. The second fine aggregate can have a particle size in the range of about 2.38 mm to 4.75 mm. In some embodiments, the second fine aggregate is about 2.38 mm in size. In some embodiments, the second find aggregate is sourced from limestone quarries in Saudi Arabia.

In order to form the CLSM, the constituents of the CLSM can be batched in stationary concrete batch plants in general conformance with ASTM C94, or mixed in mobile volumetric mixing plants in accordance with ASTM C685. In each case, there may be necessary adjustment or modifications to the plant fixtures or process to allow for introducing the HOFA and recycled concrete powder or recycled concrete aggregates in accurately-measured amounts.

Experimental Example

A variety of experimental CLSM mixes were prepared utilizing powdered basaltic lava as a cementitious material. The powdered basaltic lava was utilized as a binder, replacing varying quantities of the OPC in the mixture. The mixtures vary in powdered basaltic lava and OPC quantities. References in the following tables to basaltic lava refer to powdered basaltic lava. Dune sand containing primarily quartz was utilized as the first fine aggregate, having a specific gravity of about 2.56 and a water absorption of about 0.5%. The second fine aggregate substantially containing limestone was sized between 2.38 mm and 4.75 mm.

The mixture composition can be shown in Table 3, below:

TABLE 3

Experimental Mixture Composition

| Mix # | M0 | M10 | M15 | M20 | M25 |
|---|---|---|---|---|---|
| OPC Percent of Cementitious Material, % | 100 | 10 | 15 | 20 | 25 |

TABLE 3-continued

Experimental Mixture Composition

| Mix # | M0 | M10 | M15 | M20 | M25 |
|---|---|---|---|---|---|
| OPC, kg/m$^3$ | 110 | 40 | 60 | 80 | 100 |
| Basaltic Lava, kg/m$^3$ | 0 | 360 | 340 | 320 | 300 |
| OPC Replacement, % | 0 | 90 | 85 | 80 | 75 |
| Percent Basaltic Lava in Total Mixture, % | 0 | 12.5 | 11.9 | 11.4 | 10.8 |
| Water, kg/m$^3$ | 310 | 337 | 337 | 337 | 337 |
| First Fine Aggregate, kg/m$^3$ | 1066 | 1290 | 1266 | 1242 | 1218 |
| Second Fine Aggregate, kg/m$^3$ | 711 | 860 | 844 | 828 | 812 |
| OPC to Basaltic Lava Ratio | N/A | 1:9 | 3:17 (approximately 1:5.7) | 1:4 | 1:3 |

M0 is a control mixture which shows a typical concrete mix. The OPC Replacement percent refers to the amount of OPC replaced by the powdered basaltic lava.

Table 4 shows the density of the experimental mixtures:

TABLE 5

Density of Mixtures

| Mix # | OPC Percent of Cementitious Material, % | Trial # | L, mm | W, mm | H, mm | Weight, g | Unit weight, kg/m$^3$ | Avg. unit weight, kg/m$^3$ |
|---|---|---|---|---|---|---|---|---|
| M0 | 100% | 1 | 50.7 | 51.3 | 50.7 | 260.2 | 1973 | 1971 |
|  |  | 2 | 51.2 | 50 | 51.5 | 262.9 | 1994 |  |
|  |  | 3 | 51.2 | 50.3 | 51.1 | 255.9 | 1945 |  |
| M10 | 10% | 1 | 51.3 | 55.6 | 50.9 | 285.7 | 1969 | 1998 |
|  |  | 2 | 52.6 | 49.6 | 51.2 | 272 | 2038 |  |
|  |  | 3 | 54.3 | 51.3 | 50.7 | 280.5 | 1988 |  |
| M15 | 15% | 1 | 51.7 | 50.4 | 52.3 | 278.2 | 2043 | 2023 |
|  |  | 2 | 51.3 | 51.5 | 52.7 | 279.8 | 2011 |  |
|  |  | 3 | 51.3 | 51.6 | 53.0 | 282.4 | 2015 |  |
| M20 | 20% | 1 | 49.3 | 52 | 52.9 | 273.2 | 2016 | 2044 |
|  |  | 2 | 50.2 | 50.5 | 53 | 279.8 | 2081 |  |
|  |  | 3 | 50.9 | 50.3 | 52.8 | 275 | 2036 |  |
| M25 | 25% | 1 | 50.2 | 49.7 | 51 | 270.3 | 2124 | 2088 |
|  |  | 2 | 50.7 | 50 | 49.9 | 260.9 | 2063 |  |
|  |  | 3 | 49.5 | 50.6 | 51.2 | 266.3 | 2077 |  |

The density of the experimental mixes were lower than the conventional concrete mixtures. Conventional concrete mixtures have wet mix densities that are generally in the range of 2200 to 2400 kg/m$^3$.

Table 5 shows the compressive strength of the experimental mixtures:

TABLE 5

Compressive Strength of Mixtures

| | Compressive Strength, MPa | | |
|---|---|---|---|
| Mix # | 3-Days | 7-Days | 28-Days |
| M0 | 1.96 | 3.36 | 3.84 |
| M10 | 0.47 | 0.51 | 1.12 |
| M15 | 0.95 | 1.11 | 1.80 |
| M20 | 1.03 | 2.01 | 2.71 |
| M25 | 2.03 | 3.51 | 5.44 |

The M10 and M15 CLSM mixtures qualify as excavatable CLSM as their 28 day compressive strength is below 2.1 MPa. In the mixtures above, the compressive strength increased with increasing OPC content, such that the M20, M25, and M0 mixes are considered non-excavatable CLSM.

Table 6 shows the flow of the experimental mixtures:

TABLE 6

Flow of Mixtures

| | Flow of CLSM, mm | | | | |
|---|---|---|---|---|---|
| Mix # | Run 1 | Run 2 | Run 3 | Run 4 | Avg. |
| M0 | 203 | 201 | 197 | 205 | 202 |
| M10 | 210 | 209 | 215 | 209 | 211 |
| M15 | 209 | 213 | 215 | 212 | 212 |
| M20 | 213 | 215 | 212 | 216 | 214 |
| M25 | 214 | 217 | 215 | 218 | 216 |

CLSM must have a flow spread diameter of more than 200 mm to be classified as a CLSM. All of the experimental mixtures met the 200 mm minimum for flow required for CLSM. The experimental mixtures also showed favorable results in segregation.

Table 7 shows the bleeding and setting time of the experimental mixtures:

TABLE 7

Bleeding and Setting Time of Mixtures

| Mix # | Bleeding % | Initial Setting Time |
|---|---|---|
| M0 | 4.44 | 7 hrs, 32 mins |
| M10 | 1.39 | 7 hrs, 46 mins |
| M15 | 1.45 | 6 hrs, 48 mins |
| M20 | 1.57 | 6 hrs, 19 mins |
| M25 | 1.69 | 6 hrs, 7 mins |

All of the experimental mixtures met the 5% maximum bleeding percentage required for CLSM. Advantageously, the experimental mixtures with powdered basaltic lava had bleed rates significantly lower than the control mixture with 100% OPC. Lower bleeding rates are advantageous as mixtures with lower bleed rates have higher flowability and experience less segregation between the paste and aggregates. Additionally, bleeding rates affect the final yield of the mixture. Higher bleeding rates results in less volume and more settlement when the mixture is utilized in the field. Advantageously, the setting time of the experimental mixtures with powdered basaltic lava were lower than the control mixtures with 100% OPC. A 1.5 hour decrease in setting time is particularly advantageous in construction applications.

Embodiments of this disclosure, therefore, are well adapted to carry out the objects and attain the ends and advantages mentioned, as well as others that are inherent. While embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A controlled low strength material (CLSM) having reduced environmental impact, the CLSM comprising:
    a first fine aggregate comprising sand;
    a second fine aggregate comprising limestone, wherein the second fine aggregate is sized between 2.38 mm and 4.75 mm;
    a water; and
    a cementitious material, wherein the cementitious material comprises ordinary Portland cement (OPC) and powdered basaltic lava;
    wherein the ratio of OPC to powdered basaltic lava is in the range of 1:3 to 1:9, wherein the ratio of OPC to powdered basaltic lava is selected to produce a compressive strength equal to or below a target compressive strength, wherein the target compressive strength is a 28 day compressive strength of 8.3 MPa,
    wherein the powdered basaltic lava has a composition comprising between 35 to 45 wt % $SiO_2$ and between 6 to 17 wt % CaO,
    wherein the controlled low strength material is in the absence of fly ash,
    wherein the CLSM comprises between 10.5 wt % powdered basaltic lava and 14.5 wt % powdered basaltic lava.

2. The CLSM of claim 1, wherein the powdered basaltic lava has a composition comprising, between 7 to 18 wt % $Al_2O_3$ and between 12 to 23 wt % $Fe_2O_3$.

3. The CLSM of claim 1, wherein the target compressive strength is a 28 day compressive strength of 2.1 MPa.

4. The CLSM of claim 1, wherein the average particle size of the powdered basaltic lava is 30 μm.

5. A controlled low strength material (CLSM) having reduced environmental impact, the concrete material consisting essentially of:
    a first fine aggregate comprising sand;
    a second fine aggregate comprising limestone, wherein the second fine aggregate is sized between 2.38 mm and 4.75 mm;
    water; and
    a cementitious material, wherein the cementitious material comprises ordinary Portland cement (OPC) and powdered basaltic lava;
    wherein the ratio of OPC to powdered basaltic lava is in the range of 1:3 to 1:9, wherein the ratio of OPC to powdered basaltic lava is selected to produce a compressive strength equal to or below a target compressive strength, wherein the target compressive strength is a 28 day compressive strength of 8.3 MPa, wherein the CLSM comprises between 10.5 wt % powdered basaltic lava and 14.5 wt % powdered basaltic lava.

6. The CLSM of claim 5, wherein the target compressive strength is a 28 day compressive strength of 2.1 MPa.

7. A method for forming a concrete material having reduced environmental impact, the method comprising the step of:
    mixing together constituent materials to form a controlled low strength material (CLSM), the constituent materials comprising:
        a first fine aggregate comprising sand;
        a second fine aggregate comprising limestone, wherein the second fine aggregate is sized between 2.38 mm and 4.75 mm;
        a water; and
        cementitious materials, wherein the cementitious material comprises ordinary Portland cement (OPC) and powdered basaltic lava;
    wherein the ratio of OPC to powdered basaltic lava is in the range of 1:3 to 1:9, wherein the ratio of OPC to powdered basaltic lava is selected to produce a compressive strength equal to or below a target compressive strength, wherein the target compressive strength is a 28 day compressive strength of 8.3 MPa, wherein the controlled low strength material is in the absence of fly ash.

8. The method of claim 7, wherein the CLSM comprises between 10.5 wt % powdered basaltic lava and 14.5 wt % powdered basaltic lava.

9. The method of claim 7, wherein the target compressive strength is a 28 day compressive strength of 2.1 MPa.

* * * * *